US 8,301,627 B2

Oct. 30, 2012

(12) United States Patent
Begue et al.

(10) Patent No.: US 8,301,627 B2
(45) Date of Patent: Oct. 30, 2012

(54) AUTOMATIC DETERMINATION OF SELECTIVE MESSAGE CACHING TO SUPPORT RULES IN A TRADING PARTNER COLLABORATION MANAGEMENT ENVIRONMENT

(75) Inventors: Christophe Begue, San Francisco, CA (US); Keeranoor Kumar, Randolph, NJ (US); Mark H. Linehan, Yorktown Heights, NY (US); Prabir Nandi, Duluth, GA (US); Vishwanath Narayan, Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 453 days.

(21) Appl. No.: 12/241,977

(22) Filed: Sep. 30, 2008

(65) Prior Publication Data
US 2010/0082415 A1    Apr. 1, 2010

(51) Int. Cl.
*G06F 7/00*    (2006.01)
(52) U.S. Cl. ......... 707/736; 707/751; 705/301; 705/348
(58) Field of Classification Search ......................... None
See application file for complete search history.

(56) References Cited

U.S. PATENT DOCUMENTS

| | | | |
|---|---|---|---|
| 6,988,099 B2 | 1/2006 | Wiser et al. | |
| 7,051,072 B2 | 5/2006 | Stewart et al. | |
| 7,143,186 B2 | 11/2006 | Stewart et al. | |
| 7,249,157 B2 | 7/2007 | Stewart et al. | |
| 2001/0039570 A1* | 11/2001 | Stewart et al. | 709/205 |
| 2002/0091579 A1 | 7/2002 | Yehia et al. | |
| 2002/0161688 A1 | 10/2002 | Stewart et al. | |
| 2004/0215555 A1* | 10/2004 | Kemper et al. | 705/38 |
| 2004/0243587 A1* | 12/2004 | Nuyens et al. | 707/100 |
| 2006/0015455 A1* | 1/2006 | Hahn-Carlson et al. | 705/39 |
| 2008/0083826 A1* | 4/2008 | Henry et al. | 235/379 |
| 2008/0320486 A1* | 12/2008 | Bose et al. | 718/105 |
| 2010/0082358 A1 | 4/2010 | Begue et al. | |
| 2010/0083171 A1 | 4/2010 | Begue et al. | |

OTHER PUBLICATIONS

Non-Final Rejection dated Jun. 16, 2011 for U.S. Appl. No. 12/242,068, Begue, et al.
Non-Final Rejection dated Oct. 11, 2011 for U.S. Appl. No. 12/242,130.

* cited by examiner

*Primary Examiner* — Fred I Ehichioya
*Assistant Examiner* — Anh Tai Tran
(74) *Attorney, Agent, or Firm* — Stephen Bongini; Fleit Gibbons Gutman Bongini & Bianco PL

(57) ABSTRACT

Systems and methods are provided for selectively cache trading partner transaction messages in a trading partner collaboration environment. At least one trading partner transaction message is received. A determination is made as to whether at least one trading partner business rule requires data from the transaction message. If at least one trading partner business rule requires data from the transaction message, at least a portion of the transaction message in a transaction history cache is selectively cached. Another determination is made as to whether the transaction message is associated with a trading partner business rule. If the transaction message is associated with a trading partner business rule the transaction message is processed based on the associated trading partner business rule and previous transaction message data residing in the transaction history cache.

20 Claims, 10 Drawing Sheets

AUTOMATIC DETERMINATION OF SELECTIVE MESSAGE CACHING TO SUPPORT RULES IN A TRADING PARTNER COLLABORATION MANAGEMENT ENVIRONMENT

CROSS-REFERENCE TO RELATED APPLICATIONS

This application is related to application "Automatically Generating User Interfaces In A Trading Partner Collaboration Management Environment," Ser. No. 12/242,068, now pending, and application "Generation of Formal Specifications of Trading Partner Agreements," Ser. No. 12/242,130, now pending, which were filed on the same day as the present application and commonly assigned therewith to International Business Machines Corporation. These related applications are incorporated herein by reference in their entirety.

FIELD OF THE INVENTION

The present invention generally relates to the field of trading partner collaboration management, and more particularly relates to managing trading partner transactions by using automatic determination of selective message caching to support rules.

BACKGROUND OF THE INVENTION

The Internet has allowed companies to exploit electronic communications to engage in Business-to-Business (B2B) transactions with other companies. B2B transactions involve conducting business such as buying and selling goods and services over the Internet with trading or business partners. Trading partners are businesses that exchange goods or services for value. For example, trading partners can be a manufacturer and a raw goods supplier that supplies the manufacturer.

In B2B environments trading partners usually have trading agreements established with each other. Trading partner agreements generally cover a wide range of issues which include the enforcement of contracts, protocols, and service level agreements (SLAs) on B2B transactions. A business typically utilizes one or more trading partner management systems for managing B2B transactions with its trading partners. These systems are generally directed to defining, configuring, executing, and monitoring the business's B2B transactions and adherence of those transactions to trading partner agreements.

However, in many instances trading partners have implemented disparate systems to diversify the number of available B2B channels for B2B transactions. Because these disparate systems are deployed among trading partners, trading partner collaboration management is difficult with conventional trading partner management systems. Also, conventional trading partner management systems generally do not provide a convenient and efficient way to establish trading agreements and B2B processes with trading partners with differing supply chain models.

Another problem with these conventional trading partner management systems is that they usually do not provide support for common collaboration processes and business rules in the context of heterogeneity of B2B connectivity protocols and standards. Another drawback of conventional trading partner management systems is that B2B integrations with small and medium sized business partners that have extremely limited B2B capabilities and IT budgets are difficult to establish. Further, conventional trading partner management systems generally do not provide an improvement in the quality of B2B data in the face of many manual processes for message creation and the need for conformance to several business rules and trading partner agreements.

SUMMARY OF THE INVENTION

One embodiment of the present invention provides a method for selective caching of trading partner transaction messages in a trading partner collaboration environment is disclosed. According to the method, at least one trading partner transaction message is received. A determination is made as to whether at least one trading partner business rule requires data from the transaction message. If at least one trading partner business rule requires data from the transaction message, at least a portion of the transaction message in a transaction history cache is selectively cached. Another determination is made as to whether the transaction message is associated with a trading partner business rule. If the transaction message is associated with a trading partner business rule the transaction message is processed based on the associated trading partner business rule and previous transaction message data residing in the transaction history cache.

Another embodiment of the present invention provides an information processing system for selective caching of trading partner transaction messages in a trading partner collaboration environment is disclosed. The information processing system includes a memory, a processor that is communicatively coupled to the memory, and a trading partner collaboration manager that is communicatively coupled to the memory and processor. The trading partner collaboration manager is adapted to receive at least one trading partner transaction message. A determination is made as to whether at least one trading partner business rule requires data from the transaction message. If at least one trading partner business rule requires data from the transaction message, at least a portion of the transaction message in a transaction history cache is selectively cached. Another determination is made as to whether the transaction message is associated with a trading partner business rule. If the transaction message is associated with a trading partner business rule the transaction message is processed based on the associated trading partner business rule and previous transaction message data residing in the transaction history cache.

A further embodiment of the present invention provides a computer program storage product for selective caching of trading partner transaction messages in a trading partner collaboration environment is disclosed. The computer program storage product includes instructions for at least receiving one trading partner transaction message. A determination is made as to whether at least one trading partner business rule requires data from the transaction message. If at least one trading partner business rule requires data from the transaction message, at least a portion of the transaction message in a transaction history cache is selectively cached. Another determination is made as to whether the transaction message is associated with a trading partner business rule. If the transaction message is associated with a trading partner business rule the transaction message is processed based on the associated trading partner business rule and previous transaction message data residing in the transaction history cache.

Other objects, features, and advantages of the present invention will become apparent from the following detailed description. It should be understood, however, that the detailed description and specific examples, while indicating preferred embodiments of the present invention, are given by

DETAILED DESCRIPTION

Exemplary embodiments of the present invention will be described in detail hereinbelow with reference to the attached drawings.

Embodiments of the present invention allow trading partner collaboration management operations to be performed between trading partners to ensure that Business-to-Business (B2B) transactions adhere to trading partner agreements. There is maintained a transaction history cache that includes information that is mutually shared between trading partners and that is utilized by business rules for future transactions. By maintaining historical transaction information, message contexts can be analyzed to perform validations between multiple messages, higher-level trading partner collaboration rules can be applied to B2B transactions, and higher-level trading partner collaboration activities can be performed. This allows for more efficient and robust management of B2B transactions and trading partner collaboration adherence monitoring.

Figure 1:
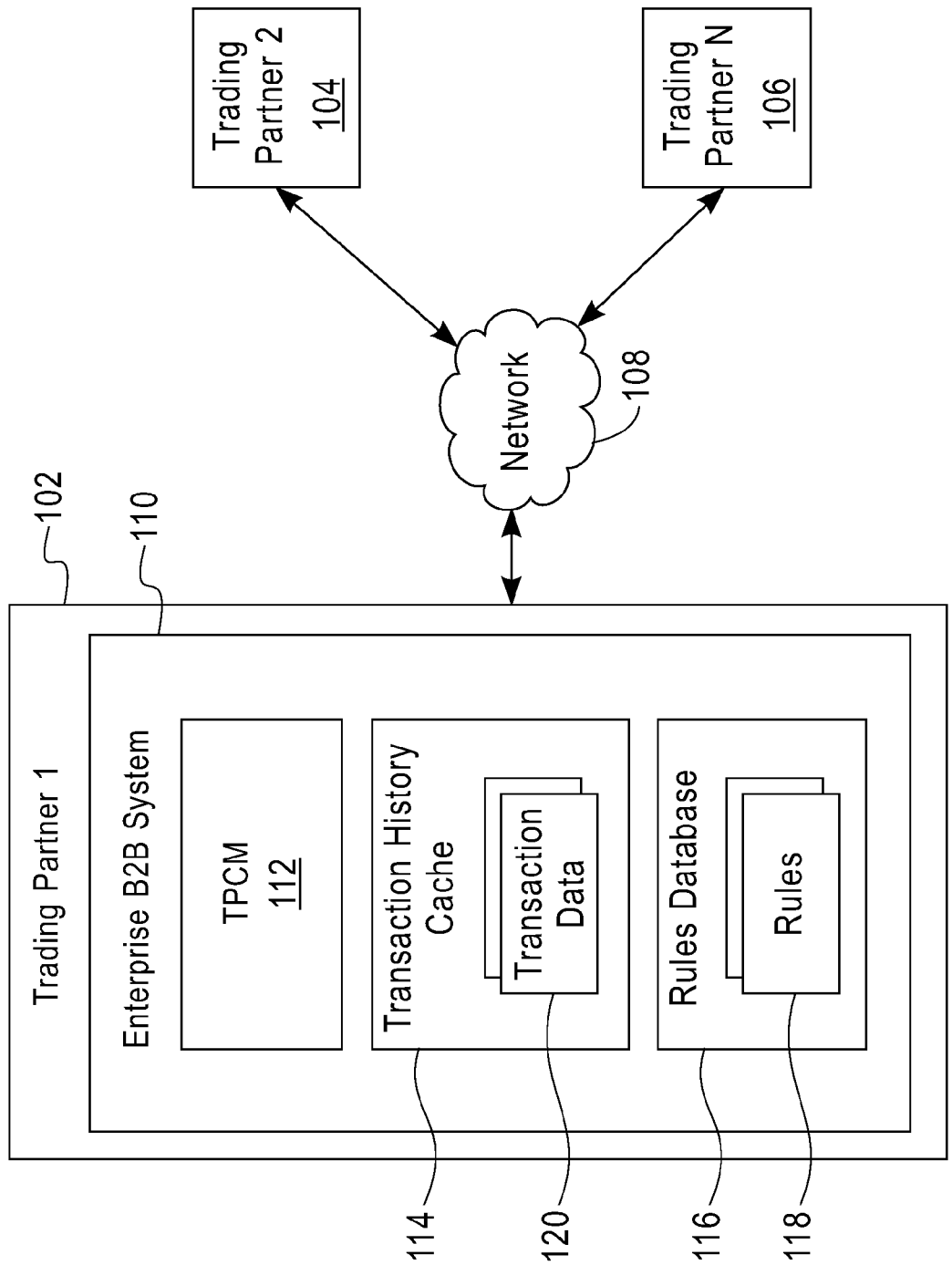
FIG. 1 is a block diagram illustrating an operating environment in accordance with one embodiment of the present invention.

FIG. 1 is a block diagram illustrating an operating environment according to one embodiment of the present invention. The operating environment includes a number of trading partners 102, 104, and 106 that are communicatively coupled to each other via one or more networks 108. Trading partners are businesses that exchange goods and/or services for value. Each trading partner 102, 104, and 106 utilizes one or more information processing systems, such as an enterprise B2B system 110, for performing, among other things, B2B transactions.

In this embodiment, the exemplary enterprise B2B system 110 includes a trading partner collaboration manager (TPCM) 112. The TPCM 112 manages the organization and coordination of trading partner activities between a given trading partner 102 implementing the TPCM 112 and the other trading partners 104 and 106. For example, the TPCM 112 manages activities such as (but not limited to) negotiations (e.g., establishing terms and conditions for collaboration), orders (and order changes or cancellations), shipment notifications, invoicing and payments, exception handling (such as errors), damaged goods, and delays.

The TPCM 112 further manages trading partner processes, business rules, message exchange and integration, and partner collaboration solutions. Trading partner process management includes supporting stateful conversational exchange of information between trading partners and enabling dynamic negotiations to determine mutually acceptable values of business parameters. Business rule management includes enforcing trading partner agreements by governing the admissibility of message transmission, intended negotiation step, and message business content in a context dependent way. Business rule management also includes enabling conditions that govern message routing, or events for measuring key performance indicators (KPIs). Message exchange integration management includes supporting automated and user-interaction-centric mechanisms to exchange B2B messages and supporting integration of B2B public processes and business rules with enterprise private processes and edge applications. Message and exchange integration management also includes performing data transformations necessary to address variability of B2B and backend data formats. Partner collaboration solution management includes monitoring of the B2B processes and message flows for tracking KPIs and exceptional behavior.

The TPCM 112 also maintains and manages a transaction information history cache 114. The transaction history cache 114 includes information 120 that is mutually shared by the trading partners 102, 104, and 106 and that is used in the execution of business rules related to new transactions. B2B transactions generally take the form of B2B messages. B2B messages can be in a variety of standard or proprietary formats such as (but not limited to) Rosettanet, EDI X12, XBRML, and ACORD. The messages can be inbound (from a trading partner) or outbound (to a trading partner). Messages can originate from or be processed by either automated software or portals that display messages as forms for interpretation or manually input by human beings. (Note that all descriptions with respect to transaction data 120 or caching message components is also applicable to "Computed Domain Parameters".) Current values of significant Computed Domain Parameters of a supply chain sub-domain in question can be, for example, when shipments, invoicing and inventory reporting against orders are split into multiple transactions, "Total Quantity Shipped To-Date", "Total Quantity Invoiced To-Date", "Total Quantity Received To-Date", "Total Current Inventory: etc. become Computed Domain Parameters. These Computer Domain Parameters are also maintained in the cache 114. These values are however not from single transactions, but are continuously computed using data from multiple arriving transactions.

The TPCM 112 enforces trading partner agreements by governing the admissibility of message transmission, intended negotiation steps, and message business content in a context dependent way utilizing the transaction history cache 114 and business rules 118. The TPCM 112 also includes one or more databases 116 that include the business rules 118 associated with each trading partner 104 and 106 of the business 102 implementing the TPCM 112. The rules 118 enable validations across multiple B2B messages/transactions between the trading partners 102, 104, and 106 and can be based on trading partner collaboration agreements.

Figure 2:
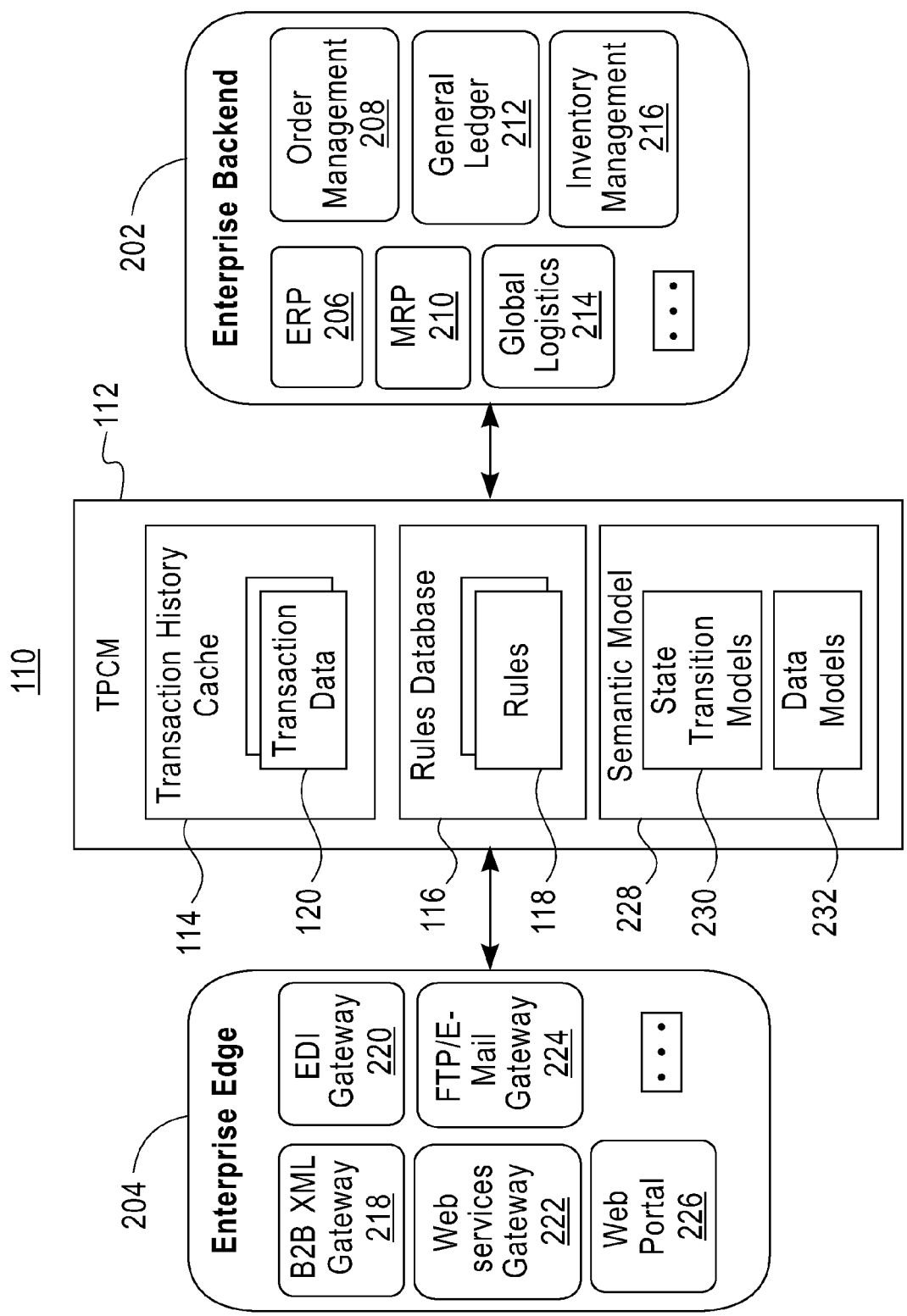
FIG. 2 is a block diagram illustrating a detailed view of an enterprise B2B information processing system according to one embodiment of the present invention.

FIG. 2 is a block diagram illustrating a more detailed view of the enterprise B2B system of FIG. 1. As shown, the enterprise B2B system 110 includes an enterprise backend 202 and an enterprise edge 204. The enterprise backend 202 includes various systems that perform associated business operations. For example, the enterprise backend 202 of this exemplary embodiment includes an Enterprise Resource Planning (ERP) system 206, an order management system 208, a Materials Requirement Planning (MRP) system 210, a general ledger system 212, a global logistics system 214, and an inventory management system 216. In further embodiments, the enterprise backend can include different systems.

The enterprise edge 204 includes various gateway applications 218-226 that interface with the other trading partners 104 and 106. The gateway applications 218-226 can either be fully automated (e.g., B2B XML, EDI (Electronic Data Interchange), or Web services) or partially automated (Web Portal or FTP/Email). In further embodiments, the enterprise edge can include different applications from those shown in FIG. 2. The enterprise edge gateways 218-226 of this embodiment provide the following functions: message format conversion (such as XML-based Trading Partner messages to/from SAP or other enterprise backend software), message routing (such as routing a purchase order (PO) message to a Backend System or routing advanced shipping notices (ASNs) to a Backend System), low-level message content validation (such as requiring that an ID field must not be empty or that the total number of line items must be between 1 and 10), and human interfacing (portal) for use by trading partners that do not support electronic trading (with the portal converting between electronic messages and "forms" (e.g., XForms) on the screen).

Unlike the enterprise edge 204 of the system of FIG. 2 that provides these messaging capabilities, a conventional enterprise edge does not include functionality for analyzing the context of a message. For example, a conventional enterprise edge cannot perform validations between multiple messages, such as determining whether an incoming "PO Cancel" message references an existing Purchase Order (PO) number or whether an incoming "PO Change" message references a PO that came from the same trading partner. A conventional enterprise edge also cannot apply higher-level trading partner collaboration rules, such as a rule that indicates a PO Cancel is not permitted before a PO Acknowledgement. A conventional enterprise edge also cannot support higher-level trading partner collaboration activities such as rejecting new PO messages after the expiration of a trading partner agreement.

In this embodiment, the TPCM 112 is situated between the enterprise edge 204 and the enterprise backend 202 for managing B2B transactions and ensuring that the transactions adhere to established trading partner agreements. By disposing the TPCM 112 between the enterprise edge 204 and the enterprise backend 202, partner collaboration processes and rules can operate orthogonal to information exchange models by utilizing a semantic model 228. The semantic model 228 comprises canonical supply chain state transition models 230 and underlying data models 232. The triggering of the state transition models 230 results in changes to B2B transactional content and states expressed in the underlying data model 232.

The semantic model 228, in this embodiment, includes cooperating layers of state transition models 230 and data models 232 that support them. For example, a transactional layer is supported by a transactional data model cache, a collaboration layer is supported by a collaboration data model cache, and a message exchange layer is supported by a message exchange data model cache. Some aspects of the semantic model 228 can be predefined such as the transactional, collaborative, and message exchange layers, and other aspects can be specified by administrators through the TPCM 112 (such as a specific data model for a particular trading partner).

Figure 10:
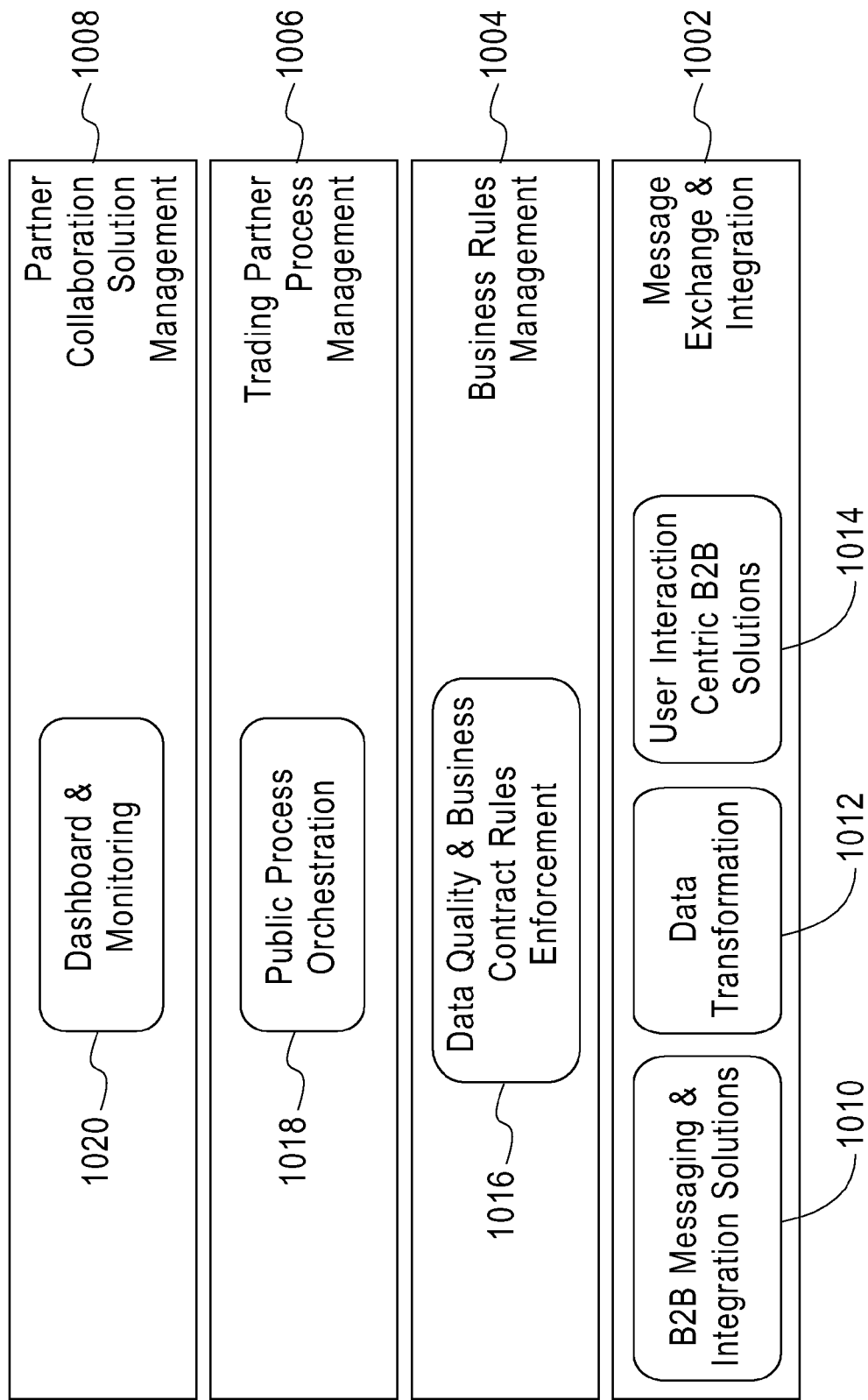
FIG. 10 is a hierarchical view of functional layers and modules of a trading partner collaboration management environment according to one embodiment of the present invention.

FIG. 10 shows a hierarchical view of the various cooperating/functional layers according to one embodiment of the present invention. In particular, FIG. 10 shows a Message Exchange and Integration layer 1002 at the lowest layer, then moving upwards there is a Business Rules Management layer 1004, a Trading Partner Process Management layer 1006, and a Partner Collaboration Solution Management layer 1008. The Message Exchange and Integration layer 1002 carries three application and partner integration functionality related modules. The first is the B2B Messaging and Integration Solutions module 1010 that offers the capabilities for machine-to-machine B2B messaging with support for standard formats and protocols such as Electronic Data Interchange (EDI) over Applicability Statement 2 (AS2), RosettaNet over RosettaNet Implementation Framework (RNIF), etc. This module also offers integration with backend applications and edge applications over Java Message Service (JMS), Message Queue (MQ), Web services etc.

The second module 1012 is the User Interaction Centric B2B Solutions module that offers capabilities for manual message inspection and construction with built-in support for ensuring conformance to message validity and business rules. The third module 1014 is the Data Transformation module that offers the support for transforming backend and partner facing data formats to the canonical format of the framework and does also include data aggregation and de-aggregation support.

The Business Rules Management layer 1004 carries a Data Quality and Business Contract Rules Enforcement module 1016 that supports the rules at runtime to detect data inaccuracy and business exceptions and to generate triggers for special actions, complex event management, and KPI measurement. The Trading Partner Process Management layer 1006 (e.g., transactional layer) carries Public Process Orchestration modules 1018 that supports the runtime state machine with associated actions underlying all the TPCM activities involving message delivery, exception handling, and solution management functions. The Partner Collaboration Solution Management layer 1008 (e.g., collaboration layer) carries a Dashboard and Monitoring module 1020 that supports solution management involving the displays of key business status and system KPIs, and capabilities for exception management.

The data model 232 captures essential supply chain B2B transactional content and state information. For example, a data model 232 can include field names and semantic meanings at each of the message exchange, collaboration, and transaction layers. The data model content is equivalent to vocabularies in the Semantics of Business Vocabularies and Business Rules (SBVR) standard or ontologies in Web Ontology Language (OWL). The data model 232 can also include current values of significant Computed Domain Parameters of the supply chain sub-domain, which have been discussed above.

Reference schemes can be included in a data model 232 to uniquely identify (i.e., by specifying primary lookup keys) messages and message contents. A data model 232 can also include static information such as trading partner identifiers and web addresses. State information such as "PO received and not responded to" can also be included in a data model 232.

Figure 3:
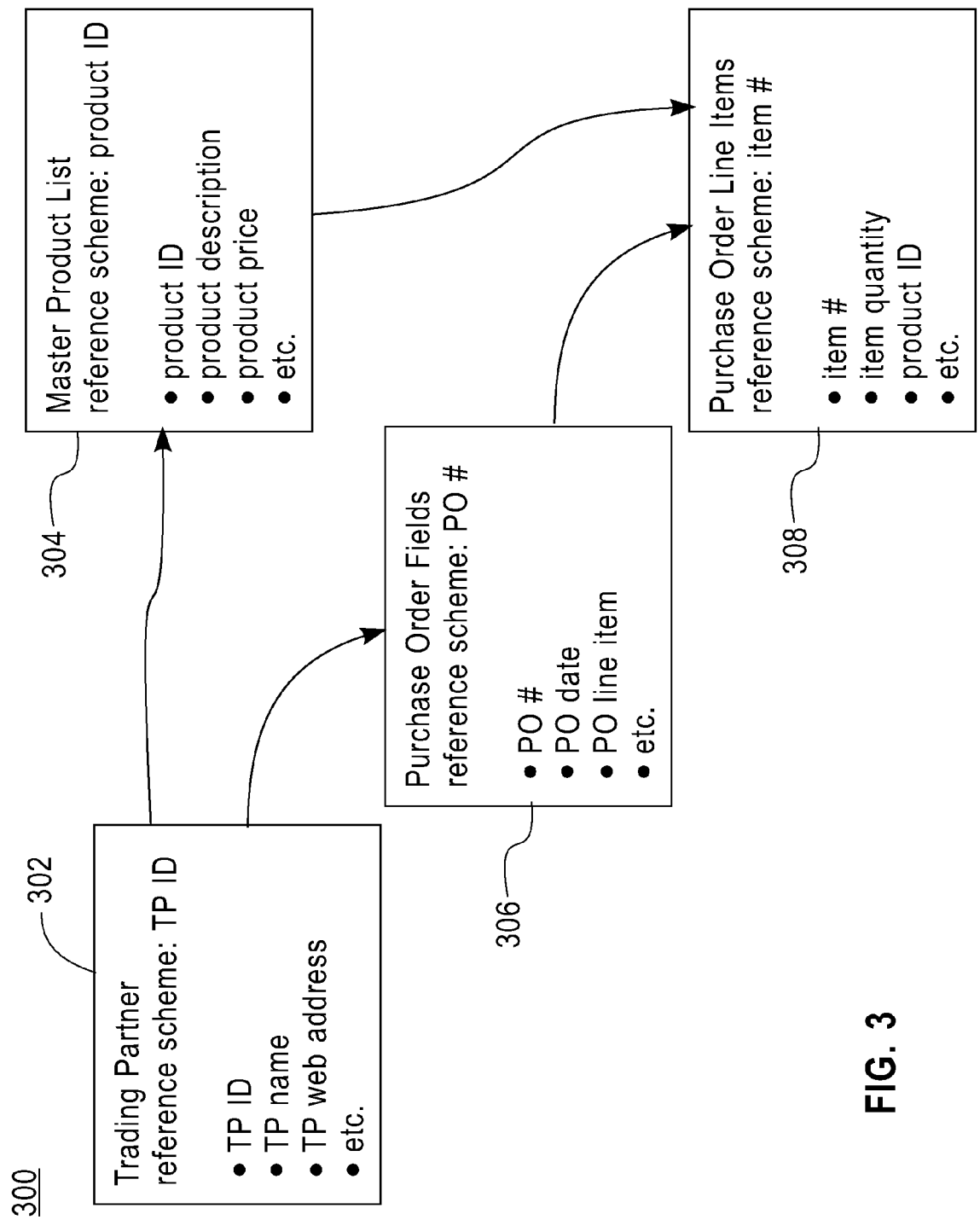
FIG. 3 is a logical view of a data model according to one embodiment of the present invention.

FIG. 3 shows an exemplary data model according to one embodiment of the present invention. The data model 300 comprises a Trading Partner 302 with reference scheme "TP ID", a Master Product List 304 with reference scheme "product ID", a Purchase Order Fields 306 with reference scheme "PO #", and a Purchase Order Line Items 308 with reference scheme "item #". FIG. 3 also shows access paths (indicated by lines connecting reference schemes), which are indexed by a target message field that indicate a sequential order that is to be taken by the TPCM 112 to reach a particular data model element. For example, to access PO line items 308, the TPCM is required to take one of the following access paths: Trading Partner→Purchase Order→PO Line Items, or Trading Partner→Master Product List→PO Line Items. Similar access paths are also defined for Computed Domain Parameters.

As discussed above, the TPCM 112 maintains a transaction information history cache 114. This cache 114 retains prior trading partner messages that have occurred between the trading partner 102 implementing the enterprise B2B system 110 (and significant Computer Domain Parameters) and the other trading partners 104 and 106. The transaction data 120 associated with these messages that is stored within the transaction cache 114 is mutually shared by the trading partners 102, 104, and 106 and is used by the TPCM 112 to execute business rules 118 that are related to new transactions. "Mutually sharing" does not necessarily mean that parameters are able to access the transaction cache 114. Instead, the information within the cache 114 is either the content of a B2B transaction message between the two partners or is computed from such content. The TPCM 112 determines which messages to maintain within the cache 114 based on the rules 118 and also supports policies for removing expired and not-in-use data. The TPCM 112, in this embodiment, determines what information to retain in the cache 118 and what information to remove from the cache by traversing an information dependency tree created by the rules 118.

The cached transaction history data 120 in the transaction history cache 114 is processed in conjunction with the rules 118 in the rules database 116 to provide more efficient and robust trading partner collaboration management and trading partner agreement adherence monitoring. The rules 118 enable validations across multiple messages and can be based on trading partner collaboration agreements. Trading partner collaboration agreements cover a wide range of issues, which include the enforcement of contracts, protocols, and service level agreements on trading partner B2B messages. Contracts are legal agreements between the businesses that include financial and business terms and conditions concerning the operation aspects of the trade. Example of contracts are: "when an order is split by a seller at least 50% of quantity must have the original delivery date", and "seller cannot quote different 'price' for the same item when the order is split".

Protocols include information exchange permissibility and sequencing/timing rules. Examples of protocols are: "seller can only counter a change request by the buyer", and "when buyer makes changes to 'quantity' the seller is allowed to make changes to the delivery date". Service level agreements (SLAs) include performance and quality of service related rules that pertain to responsiveness, timeliness, and effectiveness. An example of a performance SLA is "at least 80% of the orders which are within forecast limits must be shipped on time". An example of a quality SLA is "Account #, Item #, and Currency code, must belong to registered value for this partner and there must not be more than 6 violations in a 6 month period".

Rules 118 simplify technical requirements on the enterprise backend applications 206-216 and on trading partners 102, 104, and 106. Rules 118 are also configurable to deal with unique requirements of different trading partners. In this embodiment, rules 118 can be defined as conditional or unconditional expressions based on vocabularies (i.e., data models 232 which are part of the semantic model 228). For example, a rule 118 can refer to "the identifier of the PO" where "identifier" and "PO" and the relationship between the two come from the vocabulary. The vocabularies can be based on the SBVR standard and are business descriptions of the message contents as specified in the semantic model 228. For example, vocabularies can include field names and their semantic meanings. In this embodiment, vocabularies are equivalent to ontologies and can have reference schemes that uniquely identify (i.e., by specifying primary lookup keys) messages and message contents. One of the advantages of using rules is that they are relatively easy to change compared to hard-coded software. That can help with variations among trading partners, and can also help with evolution or change that happens with a particular trading partner. Rules can also be expressed in XML or any other formal and machine readable expression. In this embodiment, a vocabulary is provided with precise meanings for tags and elements. SBVR is a standard for expressing rules in Structured English (one of the options). Examples of other rules standards that can be used include the World Wide Web Consortium's (W3C's) Rules Interchange Format (RIF) and the Object Management Group (OMG) Production Rules Representation (PRR).

In this embodiment, a set of rules 118 is defined for each trading partner 102, 104, and 106 at each of the three layers of the semantic model 228 (i.e., the transactional layer, the collaboration layer, and the message exchange layer). The rules 118 determine the processing at each of these layers and can change over time. Rules 118 also constrain (guard) the transitions in the semantic model state transition models. For example, a rule 118 can indicate that a "PO Change" transition is not permitted if a new delivery date resulting from the "PO Change" is greater than 7 days after the existing delivery date. Thus, the state is constrained (i.e., not changed) if the condition that the new delivery date is not greater than 7 days from the existing delivery date is violated. Rules can also specify derivations such as a total cost calculated as the sum of the costs of the line items. One example of a message exchange rule used in the message exchange layer is "each invoice message must reference a corresponding Consumption Notice, and the total invoice quantity must be less than or equal to the total consumption quantity". Total consumption quantity is an example of a Computer Domain Parameter. Administrators can create, change, and delete rules through the TPCM 112.

As discussed above, the TPCM 112 defines, configures, executes, and monitors (manually with human intervention and/or autonomously) an enterprise's supply chain B2B transactions over various B2B communication channels. The TPCM 112 ensures that the transactions (e.g., B2B messages) adhere to the requirements of Trading Partner Collaboration Agreements (e.g., contracts, protocols, and SLAs) established between the business 102 implementing the enterprise B2B system and its trading partners 104 and 106. In this embodiment, the TPCM 112 manages these transactions to ensure that the agreements are satisfied (not violated) by analyzing the context of messages (e.g., performing validations between multiple messages), applying higher-level Trading Partner Collaboration rules, and supporting higher-level Trading Partner Collaboration activities. The TPCM 112 achieves this by maintaining the transaction history cache 114 that includes transaction history information 120 used by rules 118 that the TPCM 112 applies to B2B message handling. The message handling functionality of the TPCM 112 ensures that the transactions adhere to the trading partner agreements.

However, the transaction cache 114 does not retain the entire content of every message handled by the TPCM 112 in this embodiment. Maintaining the entire content of every message is inefficient, creates a scale-up challenge, and also creates privacy and security issues. Also, most of the message content is only used by the enterprise backend applications 206-216 and is not needed for collaboration management. Therefore, the TPCM 112 of this embodiment only retains information needed for the rules. The TPCM 112 also retains the information needed by the rules 118 of each associated trading partner 104 and 106.

To maintain only the necessary information in the transaction cache 114, the TPCM 112 statically analyzes the rules 118 associated with a particular trading partner 104 and 106 to determine the messages and fields/parameters to selectively cache when communicating with that trading partner. The TPCM 112 analyzes the rules 118 to determine all of the fields/parameters referenced by the rules and their ontological relationships. The identified fields/parameters (and/or the messages themselves) and Computed Domain Parameters are then maintained in the cache 114. The fields/parameters and messages can then be accessed via the reference scheme identified in the vocabulary. The TPCM 112 also statically analyzes the rules 118 to determine how long messages and/or fields/parameters are relevant and when a message or field is to be removed from the cache 114. For example, a rule such as "PO must be closed 30 days after the acknowledgement of all the shipments of PO line items" indirectly identifies how long message fields/parameters are relevant. In this example, the TPCM 112 determines that information related to a PO can be removed from the cache 114 thirty days after the relevant acknowledgments are received.

The TPCM 112 can also verify that the fields/parameters and/or messages referenced by the rules 118 are being maintained in the cache 114. This can be performed statically based on the analysis discussed above and/or dynamically based on the actual contents of the cache 114. The rules 118 can change and in this situation the TPCM 112 is able to reference cache entries for old transactions in which different information was cached. The transaction history cache 114 is configured by the TPCM 112 to automatically include the messages and/or fields/parameters that are referenced by the rules 118. If the TPCM 112 determines that the cache 114 does not include a message or field that is referenced by a rule 118, an error message is generated and displayed to the user. By selectively maintaining messages and fields/parameters in the cache 114, business rules 118 can be applied to transactions more efficiently and the TPCM 112 can more reliably manage transaction adherence to trading partner agreements.

Figure 4:
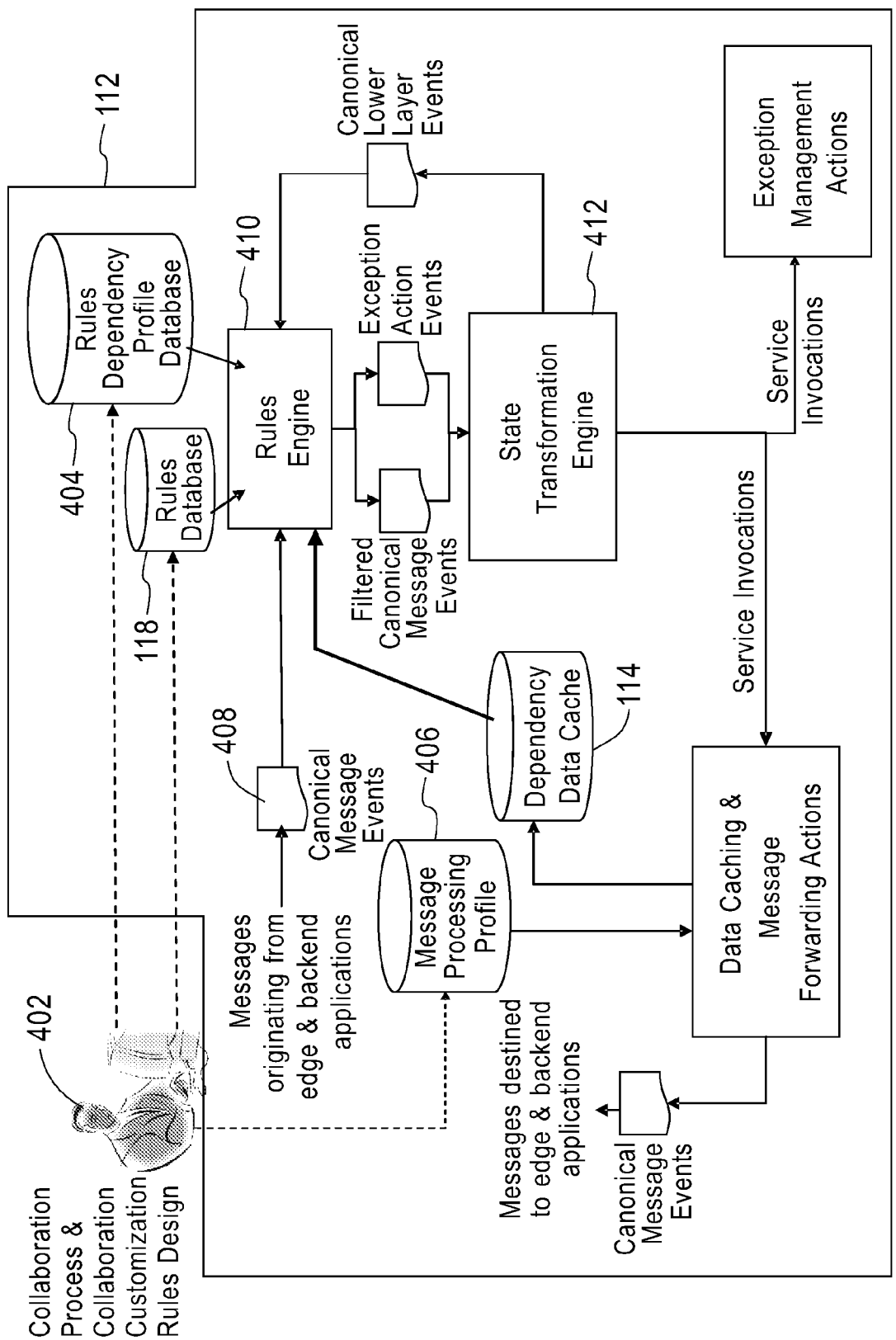
FIG. 4 is a detailed view of a transaction manager for performing trading partner collaboration management operations according to one embodiment of the present invention.

FIG. 4 is a detailed view of a TPCM for performing trading partner collaboration management operations according to one embodiment of the present invention. This componentized view of the TPCM 112 illustrates various components of the TPCM 112 for performing data caching, rule processing, and message/transaction management. In this example, an administrator 402 uses the TPCM 112 to define a new rule 118, such as "each invoice message must reference a corresponding Consumption Notice, and the total invoice quantity must be less than or equal to the total consumption quantity". This collaboration design process is further discussed in the related application "Generation of Formal Specifications of Trading Partner Agreements".

The new rule 118 is stored in a rules database 116. The TPCM 112 statically analyzes the dependency of this new rule 118 with respect to messages and message fields/parameters. For example, the TPCM 112 analyzes the rule 118 to identify the messages and/or message fields/parameters on which the rule 118 depends. This dependency information is stored within a rules dependent profile database 404. The rules dependency profile database 404 captures the dependency of rules 118 upon a data model 232. For example, a rule 118 that references "total consumption quantity" has a dependency upon a field of that name in a particular message such as a "Consumption Message" and a Computed Domain Parameter "Total Quantity Consumed". The rules dependency profile database 404 maintains these dependencies.

If all of the messages and/or fields/parameters in the rules dependency profile database 404 for the rule 118 are being implemented for the given partner relationship, then the TPCM 112 records the message components and/or Computed Domain Parameters that are to be cached in the message processing profile 406. In this embodiment, the history cache 114 is updated when processing trading partner messages. The TPCM 112 then modifies message event handling operations to include caching operations for caching the identified messaging components. If all of the messages and/or fields/parameters in the rules dependency profile 404 for the rule 118 are not being implemented for the given partner relationship, then a new or changed message definition has been received. The TPCM 112 identifies if this message or message field is already in the dependency profile database 404 for any rule. If so, the TPCM 112 records the message components to be cached as discussed above.

When a transaction occurs (i.e., an outbound or inbound message is received) as indicated by the "canonical message events" box 408, the TPCM 112 analyzes the message processing profile 406 to determine if there are any rules to be applied to this message 408. If there are not any rules to apply to this message 408, the TPCM 112 further analyzes the message 408 to determine if any rules require data from this message 408. If so, the message content or fields/parameters are cached in the transaction history (or dependency data) cache 114. If a rule 118 is to be applied to the message 408, the rules engine 410 processes one or more rules 118 against the current message 408 and cached data 120 in the history transaction cache 114 from previous messages. Any content from the message 408 that is required by other rules is then cached. However, if previous messages and/or fields/parameters have not been cached that are required by the rule 118 being processed, a message rule error is transmitted to the trading partner implementing the TPCM 112. A state transformation engine 412 changes the states of the state models 230 based on the rule/message/cached-data processing discussed above or generates an error message as discussed above. ]Once the data has been cached, the messages 408 are forwarded to the appropriate edge and backend applications.

The state transformation engine 412 changes the states of the state models 230 based on the arrival of message events. The business rules act as guards for the transitions. If the business rule is valid, the guard succeeds. Otherwise, there is an exception condition created. A successful state transition in the message exchange state transition model produces new events that are processed by collaboration state transition models. FIG. 4 shows the generation of canonical lower layer events. The collaboration layer is similar in behavior to the message exchange layer and its transitions are guarded by its own set of rules. The upper most layer is the transaction later which is also similarly modeled.

Figure 5:
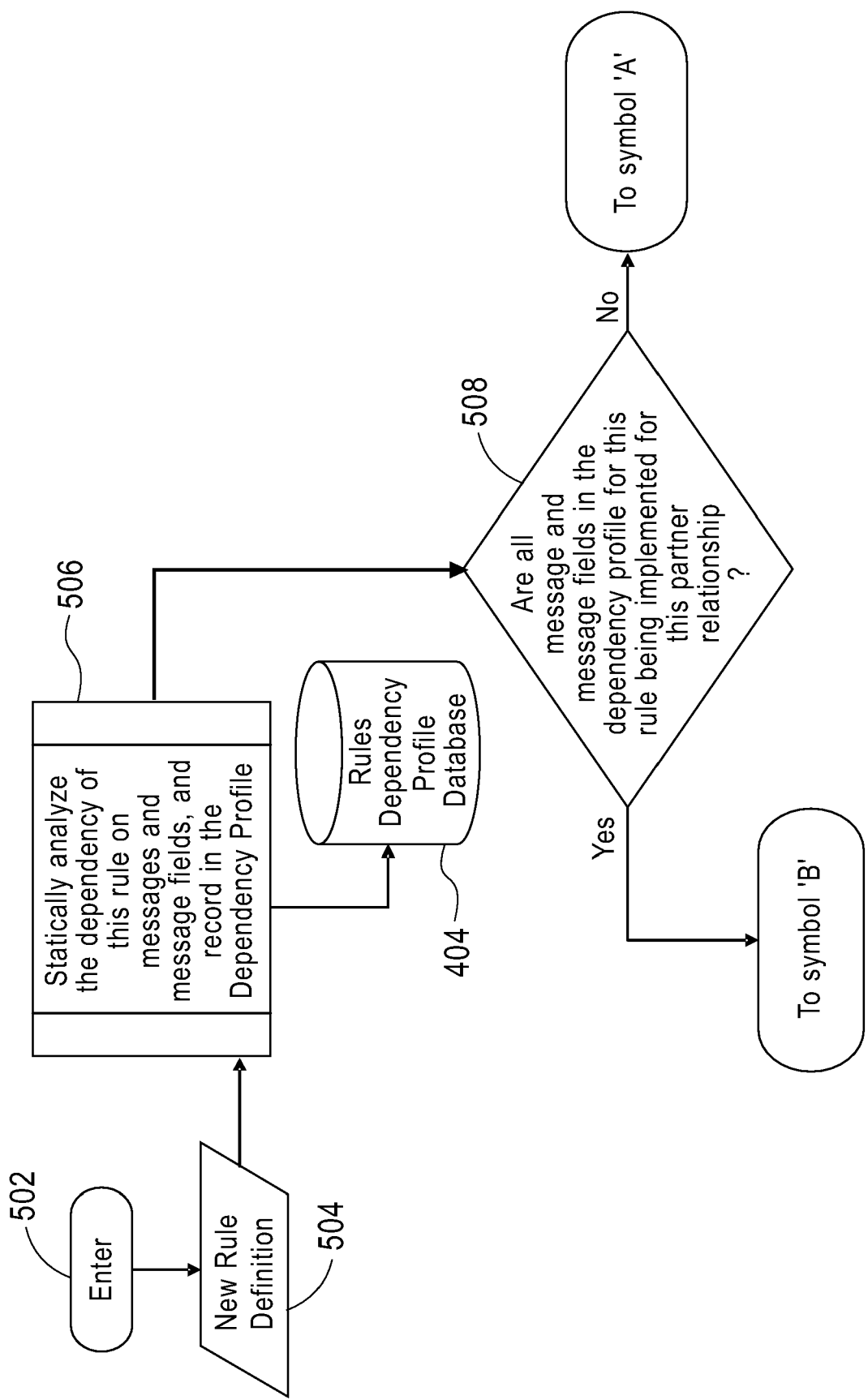
FIGS. 5 and 6 are flow diagrams illustrating a process for managing transaction rules in a trading partner collaborative environment according to one embodiment of the present invention.
Figure 6:
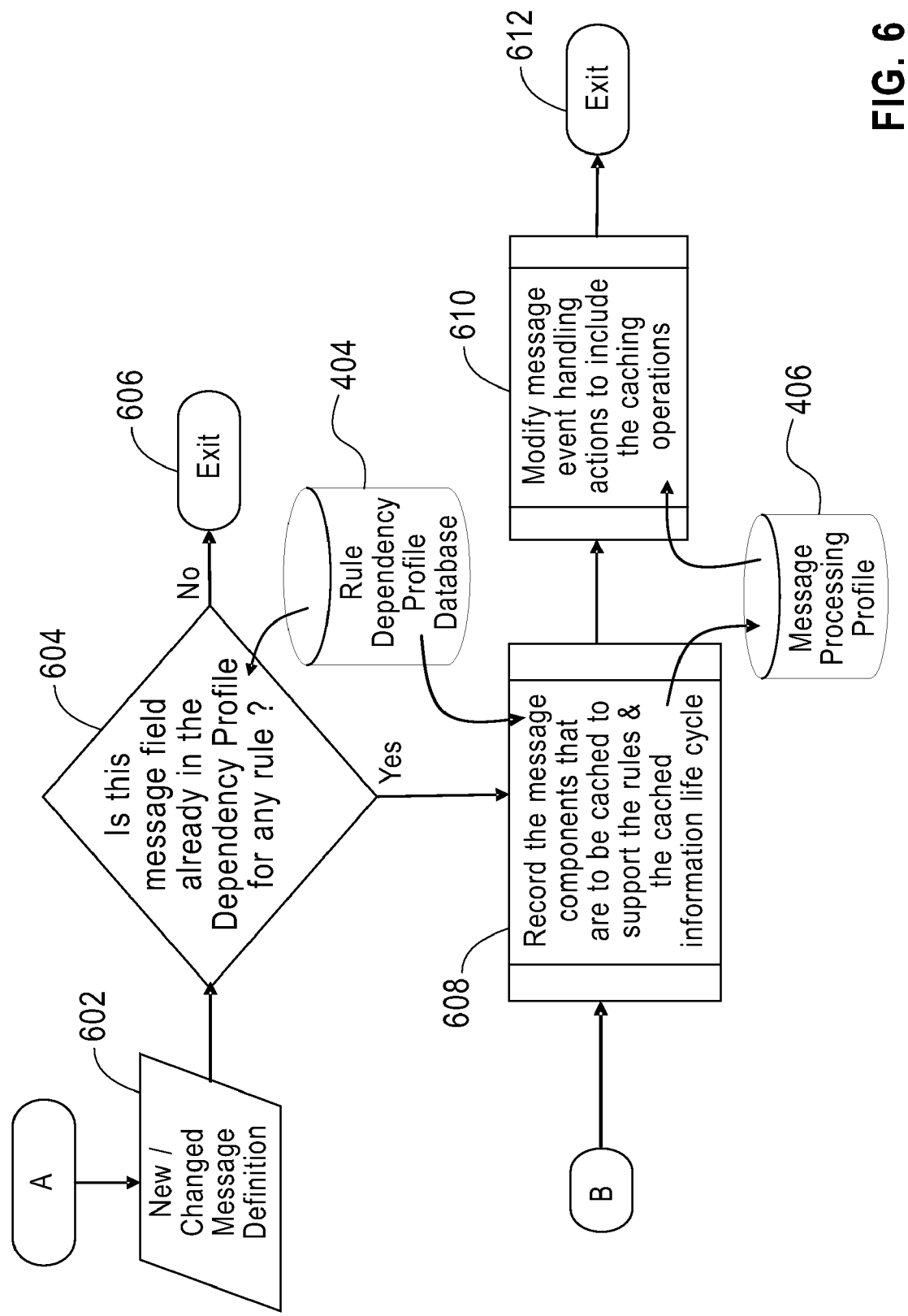

FIGS. 5 and 6 are flow diagrams illustrating a process for managing transaction rules according to one embodiment of the present invention. The flow diagram of FIG. 5 begins at step 502 and flows directly to step 504. At step 504, an administrator 402, via the TPCM 112, creates a new rule 118 such as "each invoice message must reference a corresponding Consumption Notice and the total invoice quantity must be less than or equal to the total consumption quantity". The TPCM 112, at step 506, statically analyzes the dependency of this rule on messages and fields/parameters. The TPCM 112 records these dependencies in the rules dependency profile database 404.

The TPCM 112, at step 508, then determines if all of the messages and fields/parameters in the dependency profile for this rule 118 are being implemented for this partner relationship. For example, the TPCM 112 determines if the "Consumption Notice" message and the computation of "total consumption quantity" field/parameter are implemented for this partner. If the result of this determination is negative, the control flows to entry point A of FIG. 6. If the result of this determination is positive, the control flows to entry point B of FIG. 6.

If the process goes on to entry point A of FIG. 6, the TPCM 112, at step 602, determines that a new message definition has been created or that a current message definition has been changed. The TPCM 112, at step 604, then determines if this message/message field is already in the dependency profile for any rule in the rules database 116. If the result of this determination is negative, the control flow exits at step 606. If the result of this determination is positive or if the process instead went to entry point B from FIG. 5, step 608 is performed. At step 608, the TPCM 112 records the message components that are to be cached in the message processing profile 406. These cached components support the rules 118 and the cached information life cycle. The TPCM 112, at step 610, then modifies the message event handling actions to include the caching operations so that the components identified in step 608 are cached in the transaction history cache 114. The control flow then exits at step 612.

Figure 7:
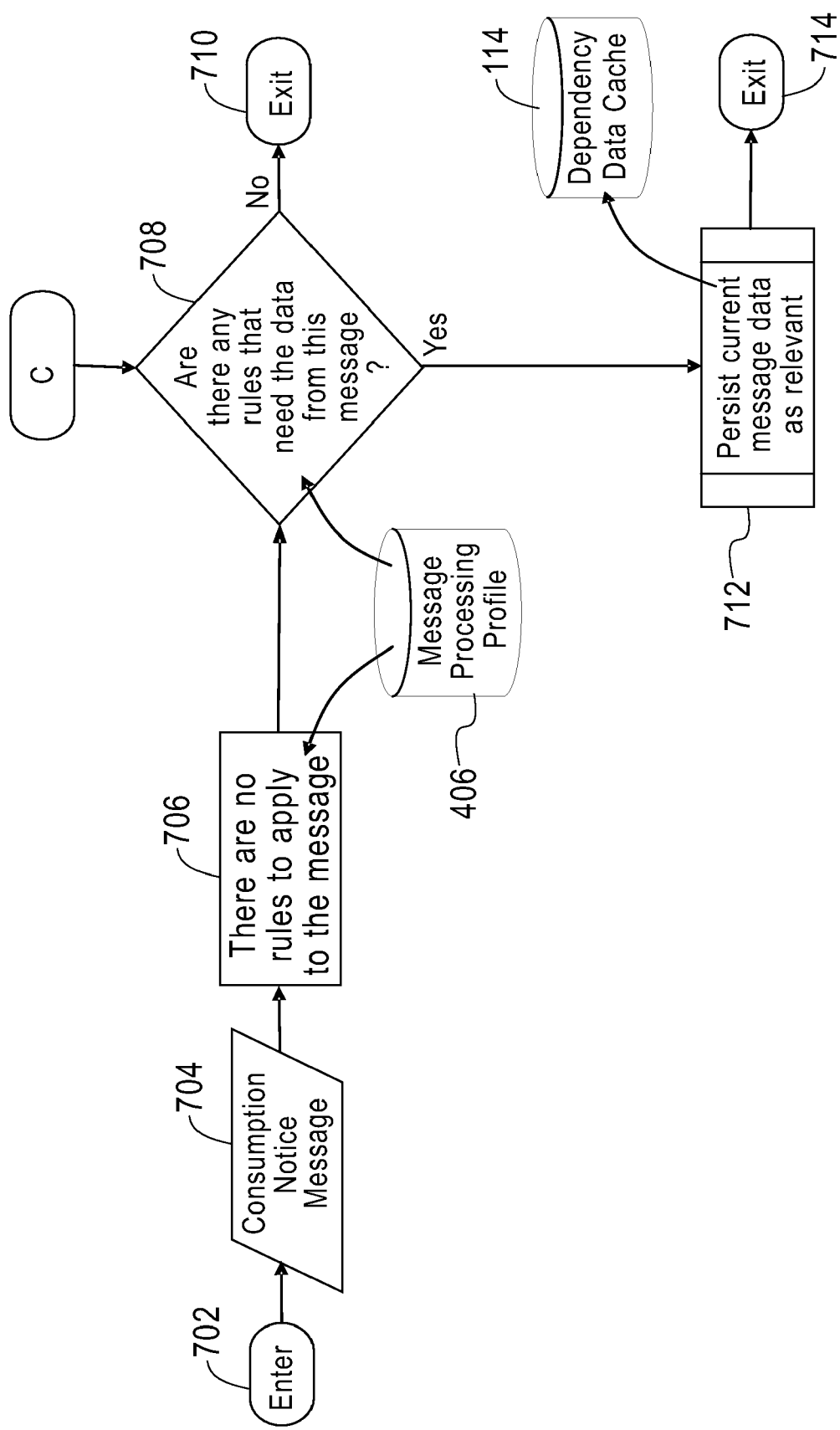
FIGS. 7 and 8 are flow diagrams illustrating a process for managing B2B transactions/messages in accordance with a cache invariant according to one embodiment of the present invention.
Figure 8:
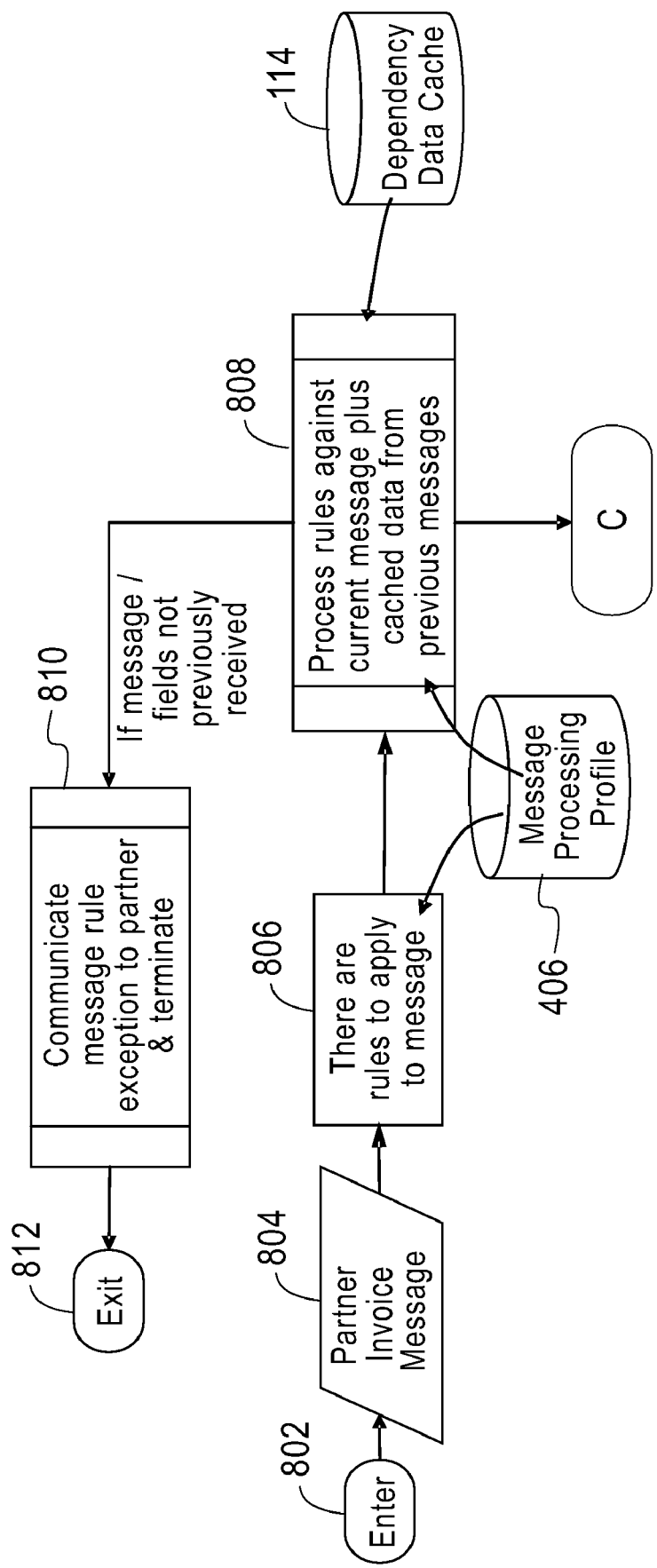

FIGS. 7 and 8 are flow diagrams illustrating a process for managing B2B transactions/messages according to one embodiment of the present invention. In this process, B2B transactions/messages are managed by utilizing the transaction history cache 114 and the rules 118 in the rules database 116. FIG. 7 shows the process for an example in which there are no rules to apply to a received message. FIG. 8 shows the process for an example in which there are rules to be applied to a received message. The operational flow diagram of FIG. 7 begins at step 702 and flows directly to step 704.

The TPCM 112, at step 704, receives a message such as a Consumption Notice message. The TPCM 112, at step 706, analyzes the message processing profile database 406 and determines that there are no rules to apply to the message. The TPCM 112, at step 708, then determines if there are any rules that need data from this message. If the result of this determination is negative, the process exits at step 710. If the result of this determination is positive, the TPCM 112, at step 712, persists current message data and computed data as relevant and caches the appropriate message content in the transaction history (dependency data) cache 114. For example, if a total quantity consumption field is needed by a rule associated with an Invoice Message, the TPCM 112 recomputes and caches the total quantity consumption field and/or consumption quantity parameter information. The process then exits at step 714.

In the example of FIG. 8, the TPCM 112, at step 804, receives a message such as a Partner Invoice message. The TPCM 112, at step 806, determines that there are rules to be applied to this message by analyzing the message processing profile database 406. The TPCM 112, at step 808, then processes rules 118 against the message plus cached data 120 in the transaction history cache 114. In this example, the cache 114 has maintained the total quantity field from the corresponding consumption notice. The process then flows to entry point C of FIG. 7 and continues as described above. However, if the message and/or fields/parameters required by the rule 118 have not been cached, then the TPCM 112, at step 810, sends a message rule exception/error to the trading partner and terminates the transaction. The process then exits at step 812.

Figure 9:
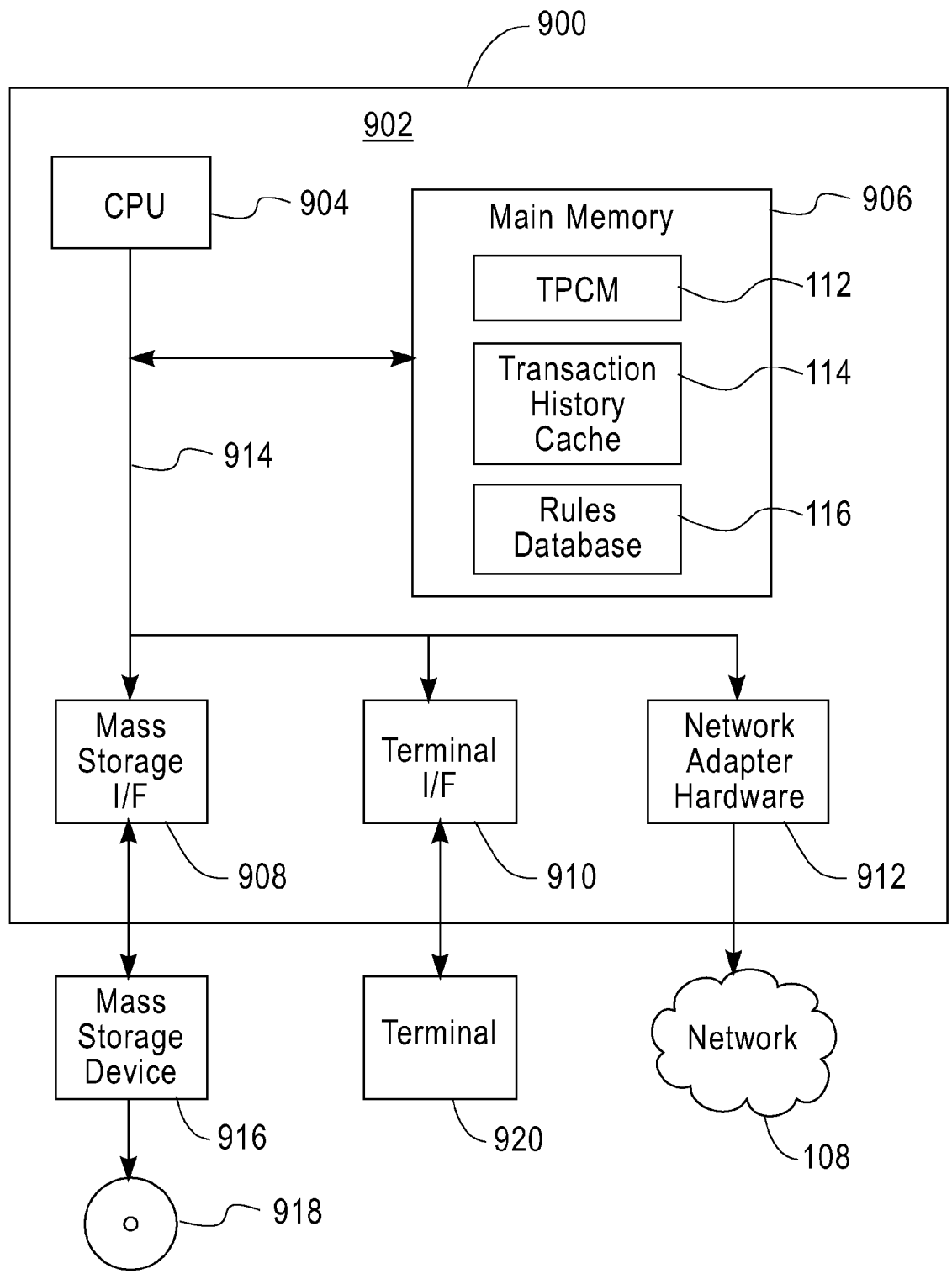
FIG. 9 is a block diagram illustrating an information processing system that is useful for implementing embodiments of the present invention.

FIG. 9 is a block diagram illustrating an information processing system that is useful for implementing embodiments of the present invention. The information processing system 900 is a suitably configured processing system adapted to implement an embodiment of the present invention. Any suitably configured processing system is able to be used, such as a personal computer, workstation, or the like.

This exemplary information processing system 900 includes a computer 902. The computer 902 has a processor 904 that is connected to a main memory 906, a mass storage interface 908, a terminal interface 910, and network adapter hardware 912. A system bus 914 interconnects these system components. The mass storage interface 908 is used to connect mass storage devices, such as data storage device 916, to the information processing system 900. One specific type of data storage device is a disk drive that can store data to and read data from a computer readable medium, such as an optical disk 918 or a magnetic disk.

The main memory 906, which can be volatile and/or non-volatile memory, in this embodiment, includes, among other things, the TPCM 112, the transaction history cache 114, and the rules database 116. The transaction history cache 114 and the rules database 116 can also be stored in a mass storage device 916.

Although illustrated as concurrently resident in the main memory 906, such components are not required to be completely resident in the main memory 906 at all times or even at the same time. In this embodiment, the information processing system 900 utilizes conventional virtual addressing mechanisms to allow programs to behave as if they have access to a large, single storage entity, referred to as computer system memory, instead of access to multiple, smaller storage entities such as the main memory 906 and data storage device 916. The term "computer system memory" thus generically refers to the entire virtual memory of the information processing system 900.

Although only one CPU 904 is illustrated for computer 902, computer systems with multiple CPUs can be used equally effectively. This embodiment of the present invention further incorporates interfaces that each includes separate, fully programmed microprocessors that are used to off-load processing from the CPU 904. Terminal interface 910 is used to directly connect one or more terminals 920 to computer 902 to provide a user interface to the computer 902. These terminals 920, which are able to be non-intelligent or fully programmable workstations, are used to allow system administrators and users to communicate with the information processing system 900. The terminal 920 is also able to be a user interface and peripheral devices that are connected to computer 902 and controlled by terminal interface hardware included in the terminal interface 910 that includes video adapters and interfaces for keyboards, pointing devices, and the like.

An operating system is included in the main memory, and is preferably a suitable multitasking operating system. However, further embodiments of the present invention use any other suitable operating system. Some embodiments of the present invention utilize an architecture, such as an object oriented framework mechanism, that allows instructions of the components of operating system to be executed on any processor located within the information processing system 900. The network adapter hardware 912 is used to provide an interface to a network 108. Embodiments of the present invention are able to be adapted to work with any data communications connections including present day analog and/or digital techniques, or a future networking mechanism.

Although this exemplary embodiment of the present invention is described in the context of a fully functional computer system, further embodiments are capable of being distributed as a program product via a tangible computer readable medium (such as a CD, DVD, diskette, flash memory device, or other form of recordable media), or via any type of electronic transmission mechanism.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computer implemented method for selective caching of trading partner transaction messages in a trading partner collaboration environment, the computer implemented method comprising the steps of:
   receiving at least one transaction message, the transaction message being a trading partner transaction message;
   analyzing at least a first trading partner business rule, the first trading partner business rule enforcing at least one trading partner agreement between at least two trading partners, and the first trading partner business rule including an unconditional expression based on a vocabulary;
   identifying, based on the analyzing, at least one of a first set of fields and a first set of parameters within the first trading partner business rule;
   comparing the at least one of the first set of fields and the first set of parameters to at least one of a second set of fields and a second set of parameters in the transaction message;
   determining, by a processor, whether the at least one of the first set of fields and the first set of parameters reference the at least one of the second set of fields and the second set of parameters;
   in response to determining that the at least one of the first set of fields and the first set of parameters of the first trading partner business rule reference the at least one of the second set of fields and the second set of parameters of the transaction message, selectively caching at least a portion of the transaction message in a transaction history cache, the portion of the transaction message comprising the at least one of the second set of fields and the second set of parameters referenced by the first trading partner business rule, which are utilized by at least the first trading partner business rule to enforce the at least one trading partner agreement;
   determining whether the transaction message is associated with a second trading partner business rule; and
   in response to determining that the transaction message is associated with the second trading partner business rule, determining whether a transaction associated with the transaction message satisfies a trading partner agreement associated with the second trading partner business rule, wherein determining whether the transaction satisfies the trading partner agreement comprises:
      identifying at least one condition within the second trading partner business rule;
      determining, based on data within the transaction message and previous transaction message data residing in the transaction history cache, whether the at least one condition is satisfied;
      in response to the at least one condition being satisfied, determining that the transaction satisfies the trading partner agreement; and
      in response to the at least one condition failing to be satisfied, determining that the transaction fails to satisfy the trading partner agreement,
      wherein the previous transaction message data is associated with at least one prior trading partner transaction message that was received prior to the transaction message.

2. The computer implemented method of claim 1, wherein the portion of the transaction message that is selectively cached includes at least one Computed Domain Parameter, the at least one Computed Domain Parameter being computed from at least one parameter in multiple trading partner transaction messages that are received.

3. The computer implemented method of claim 1, wherein the portion of the transaction message that is selectively cached is only message content that is associated with the first trading partner business rule.

4. The computer implemented method of claim 1, further comprising the step of deleting the portion of the transaction message from the transaction history cache after processing of the transaction message has been completed.

5. The computer implemented method of claim 1, wherein the step of processing the transaction message comprises:
   determining whether or not the transaction history cache includes message content from the at least one prior trading partner transaction message that is required by the second trading partner business rule; and
   in response to determining that the transaction history cache does not include message content from the at least one prior trading partner transaction message that is required by the associated rule, transmitting an error message.

6. The computer implemented method of claim 1, wherein the step of determining whether the transaction message is associated with a second trading partner business rule comprises analyzing a message profile database to identify all trading partner business rules that reference at least one message field of the transaction message.

7. The computer implemented method of claim 1, further comprising the steps of:
   identifying, based on the analyzing, dependencies associated with the first trading partner business rule on at least one of transaction messages, message fields, and Computed Domain Parameters; and creating a dependency profile for the first trading partner business rule based on the dependencies that have been identified.

8. The computer implemented method of claim 1, further comprising the step of automatically determining a time period for maintaining the portion of the transaction message in the transaction history cache based on the first trading partner business rule.

9. The computer implemented method of claim 1, wherein the step of determining, based on data within the transaction message and previous transaction message data residing in the transaction history cache, whether the at least one condition is satisfied comprises retrieving data access path information for processing the transaction message, the data access path information indicating a sequential order for retrieving data from the transaction message.

10. The computer implemented method of claim 1, further comprising the steps of:
    accessing the first trading partner business rule; and
    storing in a database information associated with at least one transaction message or message field that is referenced by the first trading partner business rule.

11. The computer implemented method of claim 1, wherein at least one of the first trading partner business rule and the second trading partner business rule is one of a contract rule, a protocol rule, and a service level agreement rule.

12. The computer implemented method of claim 1, further comprising the step of:
    preventing caching of any portion of the transaction message in response to determining that the at least one of the first set of fields and the first set of parameters fail to reference the at least one of the second set of fields and the second set of parameters.

13. The computer implemented method of claim 1, wherein determining whether the transaction satisfies the trading partner agreement comprises:
    identifying the at least one unconditional expression within the second trading partner business rule;
    determining, based on data within the transaction message and previous transaction message data residing in the transaction history cache, whether the at least one unconditional expression is satisfied;
    in response to the at least one unconditional expression being satisfied, determining that the transaction satisfies the trading partner agreement; and
    in response to the at least one unconditional expression failing to be satisfied, determining that the transaction fails to satisfy the trading partner agreement.

14. The computer implemented method of claim 10, further comprising the step of instructing a transaction manager to selectively cache trading partner transaction message components that substantially match the at least one transaction message or message field that is referenced by the first trading partner business rule.

15. The computer implemented method of claim 13, wherein the first trading partner business rule is defined as at least one unconditional expression based on a vocabulary.

16. An information processing system for selective caching of trading partner transaction messages in a trading partner collaboration environment, the information processing system comprising:
    a memory;
    a processor communicatively coupled to the memory; and
    a trading partner collaboration manager communicatively coupled to the memory and the processor, the trading partner collaboration manager being configured to:
        receive at least one transaction message, the transaction message being a trading partner transaction message;
        analyze at least a first trading partner business rule, the first trading partner business rule enforcing at least one trading partner agreement between at least two trading partners, and the first trading partner business rule including an unconditional expression based on a vocabulary;
        identify, based on the analyzing, at least one of a first set of fields and a first set of parameters within the first trading partner business rule;
        compare the at least one of the first set of fields and the first set of parameters to at least one of a second set of fields and a second set of parameters in the transaction message;
        determine whether the at least one of the first set of fields and the first set of parameters reference the at least one of the second set of fields and the second set of parameters;
        in response to determining that the at least one of the first set of fields and the first set of parameters of the first trading partner business reference the at least one of the second set of fields and the second set of parameters of the transaction message, selectively cache at least a portion of the transaction message in a transaction history cache, the portion of the transaction message comprising the at least one of the second set of fields and the second set of parameters referenced by the first trading partner business rule, which are utilized by the first trading partner business rule to enforce the at least one trading partner agreement;
        determine whether the transaction message is associated with a second trading partner business rule; and
        in response to determining that the transaction message is associated with the second trading partner business rule, determine whether a transaction associated with the transaction message satisfies a trading partner agreement associated with the second trading partner business rule, wherein determining whether the transaction satisfies the trading partner agreement comprises:
            identifying at least one condition within the second trading partner business rule;
            determining, based on data within the transaction message and previous transaction message data residing in the transaction history cache, whether the at least one condition is satisfied;
            in response to the at least one condition being satisfied, determining that the transaction satisfies the trading partner agreement; and
            in response to the at least one condition failing to be satisfied, determining that the transaction fails to satisfy the trading partner agreement,
        wherein the previous transaction message data is associated with at least one prior trading partner transaction message that was received prior to the transaction message.

17. The information processing system of claim 16, wherein the trading partner collaboration manager is further configured to:
    identify, based on the analyzing, dependencies associated with the first trading partner business rule on at least one of transaction messages, message fields, and Computed Domain Parameters; and
    create a dependency profile for the first trading partner business rule based on the dependencies that have been identified.

18. The information processing system of claim 16, wherein the trading partner collaboration manager is further configured to:
- access the first trading partner business rule; and
- store in a database information associated with at least one transaction message or message field that is referenced by the first trading partner business rule.

19. A non-transitory computer program storage product for selective caching of trading partner transaction messages in a trading partner collaboration environment, the computer program storage product comprising instructions for:
- receiving at least one transaction message, the transaction message being a trading partner transaction message;
- analyzing at least a first trading partner business rule, the first trading partner business rule enforcing at least one trading partner agreement between at least two trading partners, and the first trading partner business rule including an unconditional expression based on a vocabulary;
- identifying, based on the analyzing, at least one of a first set of fields and a first set of parameters within the first trading partner business rule;
- determining that the at least one of a first set of fields and a first set of parameters of the first trading partner business rule reference at least one of a second set of fields and a second set of parameters of the transaction message, selectively caching at least a portion of the transaction message in a transaction history cache, the portion of the transaction message comprising the at least one of the second set of fields and the second set of parameters referenced by the first trading partner business rule, which are utilized by the first trading partner business rule to enforce the at least one trading partner agreement;
- determining whether the transaction message is associated with a second trading partner business rule; and
- in response to determining that the transaction message is associated with the second trading partner business rule, determining whether a transaction associated with the transaction message satisfies a trading partner agreement associated with the second trading partner business rule, wherein determining whether the transaction satisfies the trading partner agreement comprises:
  - identifying at least one condition within the second trading partner business rule;
  - determining, based on data within the transaction message and previous transaction message data residing in the transaction history cache, whether the at least one condition is satisfied;
  - in response to the at least one condition being satisfied, determining that the transaction satisfies the trading partner agreement; and
  - in response to the at least one condition failing to be satisfied, determining that the transaction fails to satisfy the trading partner agreement,
- wherein the previous transaction message data is associated with at least one prior trading partner transaction message that was received prior to the transaction message.

20. The computer program storage product of claim 19, further comprising instructions for:
- identifying, based on the analyzing, dependencies associated with the first trading partner business rule on at least one of transaction messages, message fields, and Computed Domain Parameters; and
- creating a dependency profile for the first trading partner business rule based on the dependencies that have been identified.

* * * * *